Feb. 6, 1968 R. G. FERRIS ETAL 3,367,519
PLANETARY CABLE DRIVE FOR BOTTOM SILO UNLOADER SWEEP ARM
Filed March 21, 1966 4 Sheets-Sheet 1
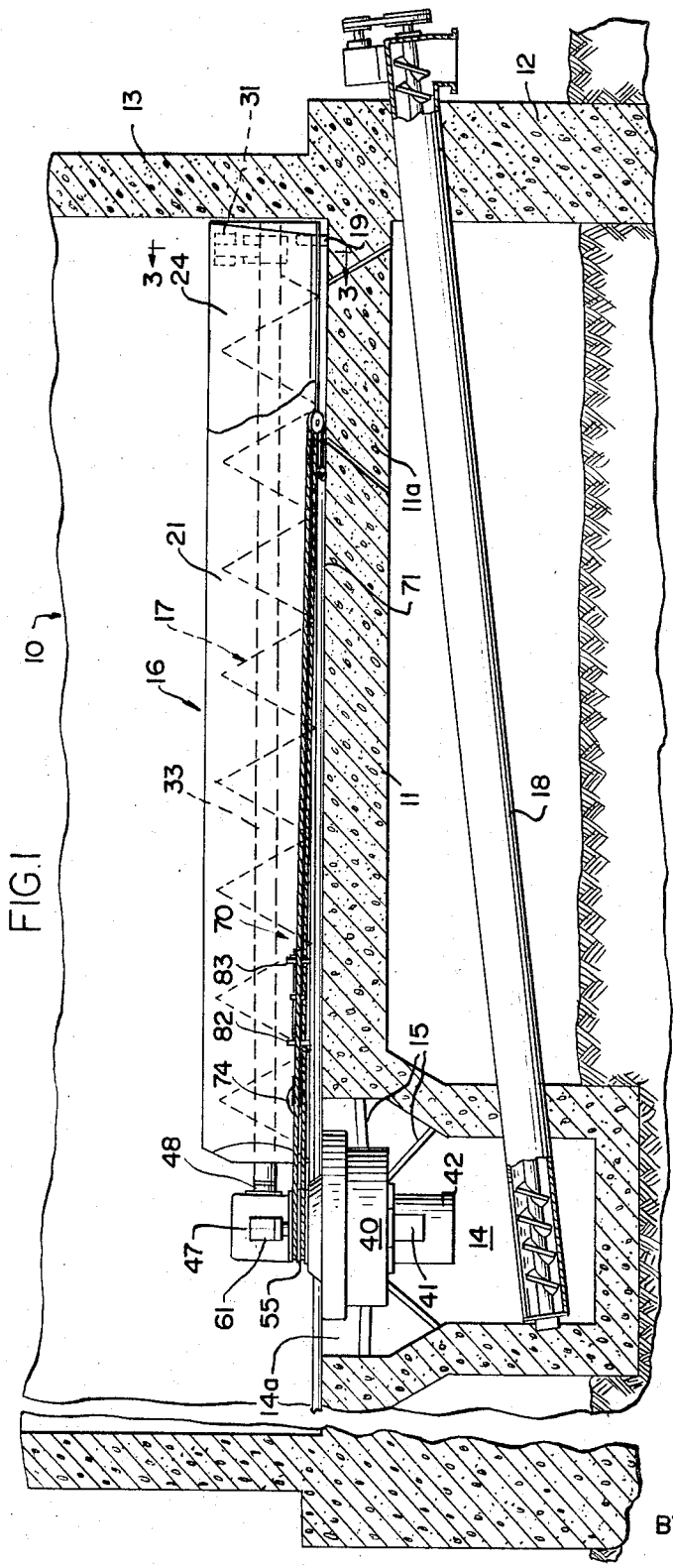
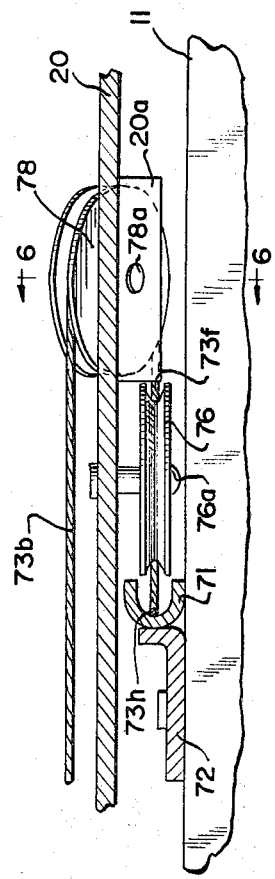
INVENTORS
JONATHAN J. LAIDIG
ROBERT G. FERRIS
BY Hofgren, Wegner, Allen,
Stillman & McCord
ATTORNEYS

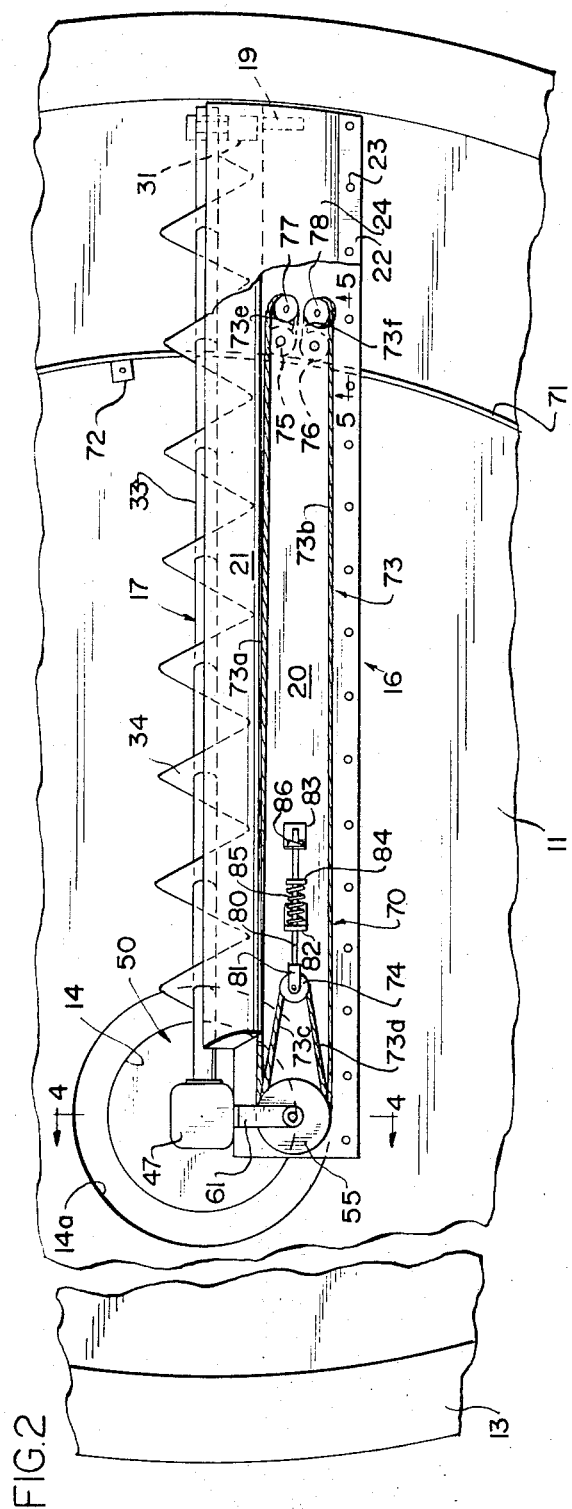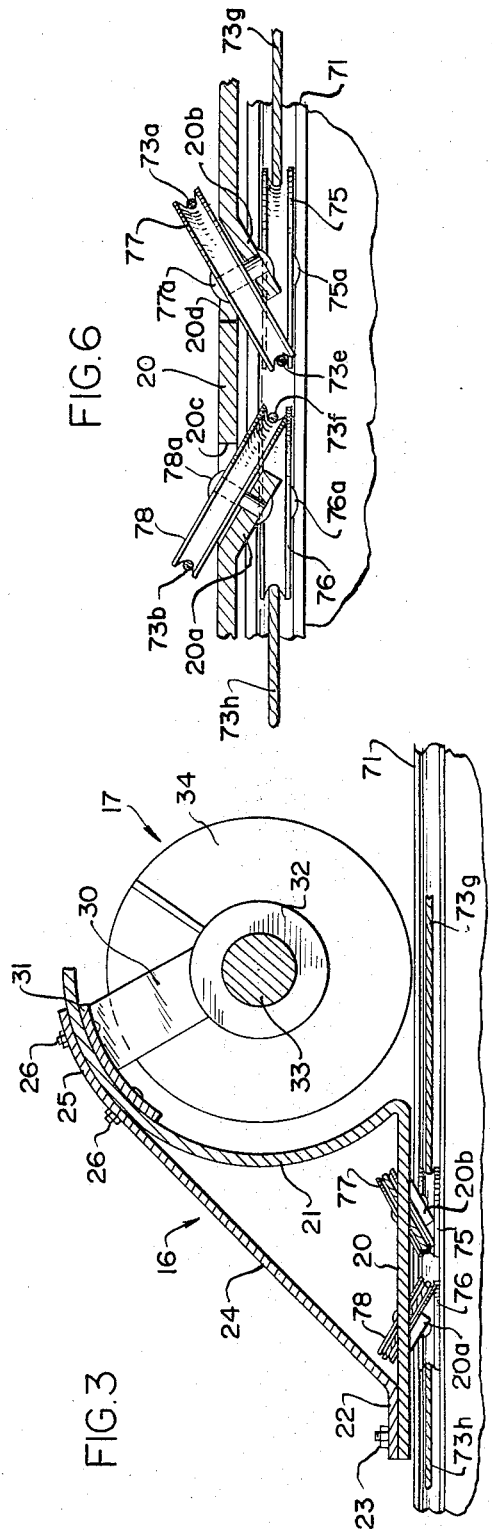

Feb. 6, 1968  R. G. FERRIS ETAL  3,367,519
PLANETARY CABLE DRIVE FOR BOTTOM SILO UNLOADER SWEEP ARM
Filed March 21, 1966  4 Sheets-Sheet 3
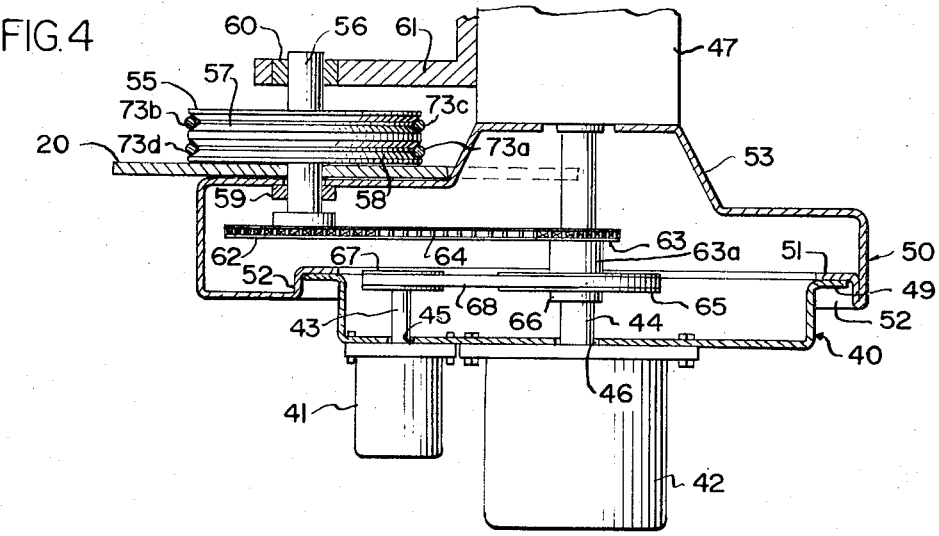
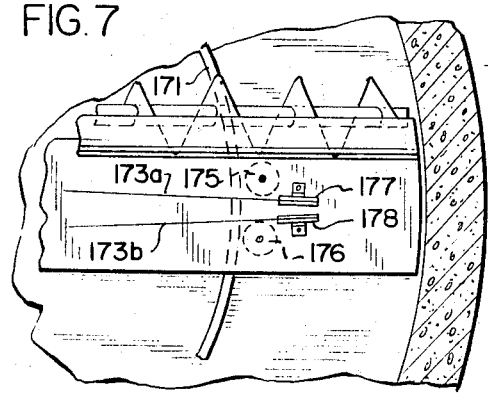
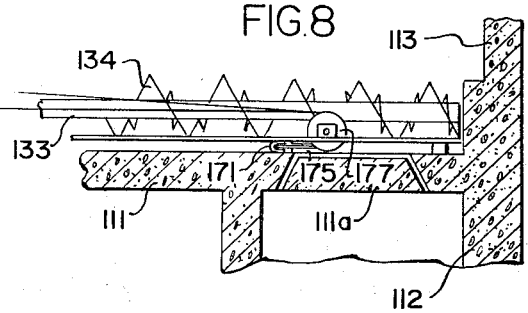
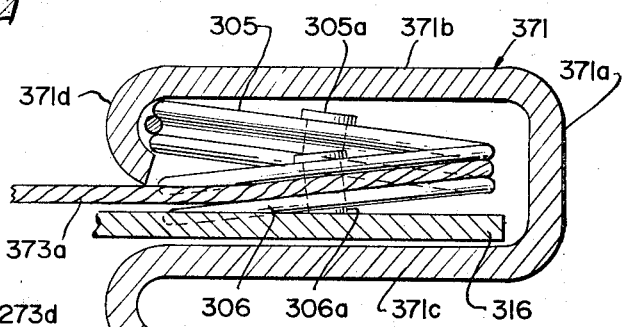
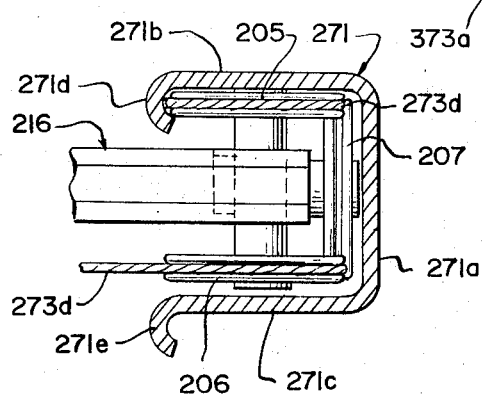

Feb. 6, 1968  R. G. FERRIS ET AL  3,367,519
PLANETARY CABLE DRIVE FOR BOTTOM SILO UNLOADER SWEEP ARM
Filed March 21, 1966  4 Sheets-Sheet 4

United States Patent Office 3,367,519
Patented Feb. 6, 1968

3,367,519
PLANETARY CABLE DRIVE FOR BOTTOM SILO UNLOADER SWEEP ARM
Robert G. Ferris, Harvard, Ill., and Jonathan J. Laidig, Mishawaka, Ind., assignors to Starline, Inc., a corporation of Illinois
Filed Mar. 21, 1966, Ser. No. 536,093
31 Claims. (Cl. 214—17)

ABSTRACT OF THE DISCLOSURE

A silo unloader wherein an endless flexible drive transmitting member is wrapped around a circular track within a silo and over a planet member rotatably mounted on an arm having an auger conveyor thereon for moving silage radially inwardly of the silo toward an axial opening in the center of the silo floor, with a driven sun member being rotatably mounted on said arm and cooperating with said track, planet member and drive transmitting member to define planetary drive means for rotating said arm.

This application relates in general to unloading apparatus for silos, and in particular it relates to apparatus for removing material from the bottom of a mass of material stored in a silo.

The apparatus of the present invention is related to silo unloading apparatus such as that disclosed and claimed in Laidig Patent No. Re. 25,863, reissued Sept. 21, 1965. In accordance with the disclosure of the Laidig patent, a silo floor is provided with a central opening, and a radially disposed sweep arm is mounted for rotation about the axis of the silo. The sweep arm is provided with conveyor means in the form of an auger for moving silage radially inwardly toward the central opening where it may drop through to a discharge conveyor which carries it to the outside of the silo. The outermost end of the sweep arm carries a plow, which is received in an inwardly opening track in the silo wall. An annular endless chain is fixed in the track, and a driven sprocket on the plow engages the chain for propelling the sweep arm about the axis of the silo. A first motor is provided for rotating the drive sprocket and propelling the sweep arm, while a second motor is provided for driving the auger conveyor. The precise structure there illustrated is not wholly satisfactory because it is difficult to positively secure the chain around the periphery of the silo with its links positioned for proper engagement by the driven sprocket. Several systems have been proposed as a substitute for the above described chain and sprocket, and these include such systems as rack and pinion, ratchet and pawl, and the like. These systems, like all positive engagement systems, require extreme accuracy in alignment between the interengaging members and are thus expensive and subject to malfunction as they wear.

Accordingly, the general purpose of the present invention is to provide drive means for propelling the sweep arm of a silo unloader, such as that shown in the Laidig patent, which eliminates the accuracy of alignment problem present in positive engagement drive systems.

An object of the invention is to provide an improved silo unloader which is simple in construction, and thus relatively inexpensive to manufacture and maintain.

A more specific object of the invention is to provide a cable actuated, planetary drive system for rotating the sweep arm of a bottom unloading silo.

A related object is to provide a drive system, as set forth in the preceding paragraph, which minimizes friction, and thus reduces power requirements and wear between the drive components.

Another object of the invention is to provide drive means for the sweep arm of a bottom unloading silo which is independent of the drive to the conveyor carried by the sweep arm, so that the sweep arm may be rotated in either direction, when desired.

These and other objects of the invention will hereinafter become more fully apparent from the following description, taken in connection with the annexed drawings, wherein:

FIG. 1 is a fragmentary, vertical cross sectional view through the bottom portion of a silo, and illustrates a first embodiment of the invention with certain parts broken away for clarity of illustration;

FIG. 2 is a fragmentary plan view of the structure ilustrated in FIG. 1;

FIG. 3 is an enlarged sectional view taken generally along line 3—3 of FIG. 1;

FIG. 4 is an enlarged fragmentary sectional view taken generally along line 4—4 of FIG. 2;

FIG. 5 is an enlarged sectional view taken generally along line 5—5 of FIG. 2;

FIG. 6 is a sectional view taken generally along line 6—6 of FIG. 5;

FIG. 7 is a fragmentary schematic plan view on a reduced scale, and illustrating a second embodiment of the invention;

FIG. 8 is a fragmentary vertical sectional view taken generally radially of a silo and illustrating the structure of FIG. 7;

FIG. 11 is an enlarged sectional view taken generally along line 11—11 of FIG. 9;

FIG. 12 is a view similar to FIG. 11 but on an enlarged scale, and illustrating still another embodiment of the present invention;

Figure 9:
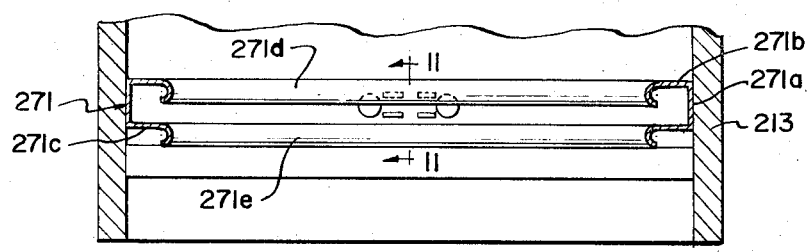
FIG. 9 is a fragmentary vertical sectional view of the bottom portion of a silo, with certain parts broken away for clarity of illustration, and illustrating another embodiment of the present invention.

While this invention is susceptible of embodiment in many different forms, there is shown in the drawings and will herein be described in detail a preferred embodiment of the invention and modifications thereof, with the understanding that the present disclosure is to be considered as an exemplification of the principles of the invention and is not intended to limit the invention to the embodiments illustrated. The scope of the invention will be pointed out in the appended claims.

Referring to the drawings in greater detail, a silo 10 is shown in FIG. 1 as having a floor 11, the periphery of which is supported on a cylindrical foundation wall 12 from which a cylindrical silo wall 13 extends upwardly. An axial opening 14 in the floor of the silo is provided with a spider assembly including arms 15, which carry support structure for rotatably mounting a sweep arm, indicated generally at 16. First conveyor means in the form of an auger conveyor 17 is mounted on the sweep arm 16 for translating silage radially inwardly of the silo as the sweep arm rotates. Second conveyor means in the form of an auger conveyor 18 communicates with the opening 14 beneath the floor 11 for transferring silage to the exterior of the silo. An outrigger bearing shoe 19 at the outer end of sweep arm 16 rests on the upper surface of floor 11 and supports the sweep arm during its rotational movement.

As can be best seen in FIG. 3, sweep arm 16 is hollow, and generally triangularly shaped in cross section. Sweep arm 16 includes a first structural member having a horizontal base portion 20, and an upwardly extending, generally semi-cylindrically shaped arcuate portion 21. Sweep arm 16 further includes a second structure member having a horizontal lower portion 22 secured to member 20 by fasteners 23, an intermediate inclined portion 24 extending upwardly from portion 22, and an arcuate upper portion 25 secured to member 21 by fasteners 26.

The outer end portion of auger conveyor 17 is supported on the sweep arm 16 by a support arm 30 which is shown in FIG. 3 to have a curved, laterally outwardly extending flange 31 at its upper end secured to the under surface of member 21. Support arm 30 has a hollow, cylindrically shaped bearing portion 32 at the lower end thereof, which rotatably receives therein the shaft 33 of the auger conveyor 17. As is well known, a spiral member 34 is secured to the shaft 33 to define the auger conveyor 17. The inner end of shaft 33 is connected to drive means to be hereinafter described. But for changes in the shape of the hollow sweep arm to accommodate the drive mechanism of this invention, the foregoing description is substantially of the structure of Laidig Reissue Patent No. 25,863.

The drive means for rotating the auger conveyor shaft 33, and for rotating the sweep arm 16, are mounted in an enlarged portion 14a at the upper end of the opening 14 in the silo floor, and will be best understood from a consideration of FIG. 4. A stationary motor support housing 40 is suitably secured to the spider arms 15 by welding, riveting or the like; and a sweep arm drive motor 41 and an auger drive motor 42 are secured to the base of housing 40, with their respective output shafts 43 and 44 passing upwardly through clearance openings 45 and 46 in the housing base. Shaft 44 extends upwardly generally coaxially of the silo into a speed reducer gear box 47; and the output shaft 48 (FIG. 1) of the speed reducer is positioned at right angles with respect to the shaft 44, and is drivingly connected with auger shaft 33 for rotation of the auger conveyor 17. Other power sources, such as a hydraulic motor or an internal combustion engine, may be used in place of electric motors 41 and 42, if desired. Since the output shaft 43 of sweep arm drive motor 41 is offset from the axis of the silo, the necessity of providing a collector ring at the pivot axis of the sweep arm is eliminated.

Housing 40 is generally dish-shaped, and includes an annular horizontally disposed flange 49 extending radially outwardly from the upper end of a generally cylindrically shaped side wall. A sweep arm supporting housing 50 is rotatably mounted on housing 40, and has a radially inwardly directed, horizontally disposed flange 51 seated upon the flange 49 of housing 40. A generally cylindrical wall 52 extends downwardly from flange 51 and surrounds flange 49 to properly locate the housing 50 on the housing 40. Housing 50 includes a generally frusto-conically shaped upper portion 53, and sweep arm frame member 20 is secured to housing portion 53, as by welding or the like. From the foregoing it will be apparent that the sweep arm 16 and housing 50 are mounted for rotation together as a unit about housing 40. The weight of housing 50 and the structural elements associated therewith, and the passage of shaft 44 through housings 40 and 50 and its engagement therewith, tend to keep housing 50 firmly seated on housing 40 even if a lifting force is applied to housing 50. However, if desired, retaining lugs (not shown) engageable with flange 49 may be provided on wall 52 to positively retain the housing 50.

The means for rotating the sweep arm 16 further includes a drive sheave 55 (FIGS. 1 and 4) fixed on a vertical shaft 56 that is offset from the axis of opening 14. Sheave 55 includes a pair of vertically spaced grooves 57 and 58 for a purpose to hereafter appear. Shaft 56 extends through sweep arm frame member 20 into the interior of housing 50, and is rotatably supported by a bearing 59 on the top wall of the housing 50, and a bearing 60 carried by an arm 61 secured to the gear box housing 47. A sprocket 62 is secured to the lower end shaft 56, and is drivingly connected with a second sprocket 63 by an endless chain 64. Sprocket 63 is connected by a hub 63a to a sheave 65 to form an integral rotatable unit; and this unit is rotatably supported and mounted on a flanged bearing 66 on shaft 44. A drive sheave 67 is fixed on the output shaft 43 of motor 41, and an endless belt 68 is trained over sheaves 65 and 67. Thus, when motor 41 is energized, sheave 65 is rotated independently of shaft 44 by belt 68. Sheave 55 is rotated by chain 64 and sprockets 62 and 63, and the rotation of sheave 55 is utilized to actuate a cable means 70 for rotating the sweep arm 16. Since sheave 65 and sprocket 63 are rotatably mounted on shaft 44, it will be readily apparent that the drive to the auger conveyor 17 is entirely independent of the drive system for rotating the sweep arm 16.

In the drive system embodiment of FIGS. 1–6, a circular, C-shaped track 71 is positioned concentrically outwardly of opening 14; and is secured to the silo floor 11 by a plurality of circumferentially spaced brackets 72. Track 71 defines a fixed reaction member of a planetary drive system for rotating the sweep arm 16. Sprocket 63, hub 63a and pulley 65 together define a driven sun member of the aforementioned planetary drive system, while sprocket 62 and sheave 55 form a planet member. Cable means 70 includes an endless cable 73 trained over sheave 55 and over a series of pulleys, including a pulley 74 adjacent the inner end of sweep arm 16 and pulleys 75–78 radially outward of track 71, and then entirely around the track 71. The cable means 70 forms a drive transmitting member drivingly engaging sheave 55, track 71 and sweep arm 16 through pulleys 75–78. In another embodiment, not shown, track 71 may also be used as a guide for the sweep arm supporting bearing shoe, since track 71 provides a true and accurate guiding surface. In this arrangement the upper lip of track 71 would also serve to prevent the sweep arm 16 from raising up, as tends to occur under some conditions.

Means are provided for retaining a predetermined amount of tension in the cable 73, and includes a rod 80 having a bracket 81 at one end thereof which rotatably supports pulley 74. Rod 80 is mounted in suitable openings in a pair of longitudinally spaced L-spaced brackets 82 and 83 secured to sweep arm portion 20. A retainer 84 is fixed on rod 80 between brackets 82 and 83, and a spring 85 engages the upstanding portion of bracket 82 and retainer 84 to urge the rod 80 to the right as viewed in FIG. 2. Suitable means are provided for locking the rod 80 in a selected position, and to this end, an angle member 86 may be pivotally mounted on the upstanding portion of bracket 83 and canted with respect to the axis of rod 80 to provide a biting edge which prevents movement of rod 80 to the left as viewed in FIG. 2. It will be understood that with such an arrangement the rod 80 can be moved to the right to change the amount of tension in the cable 73, yet it will be securely held in position once the desired tension has been achieved. Other suitable means for retaining the rod 80 against movement relative to the sweep arm may be provided, as will be readily apparent to those skilled in the art.

Endless cable 73 includes a first reach portion 73a, which extends between pulley 77 and groove 58 of sheave 55; and a second reach portion 73b, that extends between pulley 78 and groove 57 of sheave 55. Cable 73 includes further portions 73c and 73d which extend outwardly from sheave 55 and from cable portions 73b and 73a respectively, and are looped over pulley 74. Since cable portion 73c extends from the upper groove 57 of sheave 55, and cable portion 73d extends from the lower groove 58 of sheave 55, the pulley 74 will assume a slightly inclined position relative to the sweep arm portion 20, as can be best seen in FIG. 1.

As seen in FIGS. 3, 5 and 6, pulleys 77 and 78 are positioned at an angle with respect to the horizontal plane defined by the portion 20 of the sweep arm 16. For this purpose, inclined portions 20a and 20b extend downwardly from sweep arm portion 20 leaving openings 20c and 20d. Suitable fasteners 77a and 78a rotatably secure pulleys 77 and 78 on sweep arm portions 20b and 20a, respectively. Pulleys 75 and 76 are suspended beneath the sweep arm portions by suitable fasteners 75a and 76a, and pulleys 75 and 76 are disposed in a horizontal plane parallel with sweep arm portion 20 and passing through the track 71. Pulleys 75 and 76 are positioned inwardly of pulleys 77 and 78 on sweep arm 16, and the lower portions of pulleys 77 and 78 are positioned generally in the plane of pulleys 75 and 76. Cable reach portion 73a is trained over pulley 77, and is directed downwardly and inwardly thereby, while a further cable portion 73e extends from pulley 77 to pulley 75, and a still further cable portion 73g extends laterally outwardly from pulley 75 into track 71. In a like manner, cable reach portion 73b is trained over pulley 78 and is directed downwardly and inwardly thereby, while a further cable portion 73f extends inwardly from pulley 77 to pulley 76, and a still further cable portion 73h extends laterally outwardly from pulley 76 into track 71.

The relatively large circumference of track 71 provides sufficient frictional resistance to the cable 73, so that when sheave 55 is rotated by motor 41, the cable is not driven along the track. As a result, a force is applied to the sweep arm 16 through pulleys 75–78 which will cause the sweep arm to rotate about the silo axis. During rotation of the sweep arm 16, substantially no slippage occurs between cable 73, and sheave 55 and track 71; and as the sweep arm rotates, the cable 73 merely leaves and is relayed in track 71. In normal operation, the motor 41 rotates the sheave 55 in a counterclockwise direction so as to propel the sweep arm 16 in a counterclockwise direction about the silo. Motor 41 is preferably a reversible electric motor, so that reversal of the direction of rotation of the sweep arm 16 can be effected, as for example may become necessary when movement of the sweep arm is impeded by overloading or the like. An access opening is provided in the silo floor below the path of movement of pulleys 75–78 for servicing purpose, and a removable cover 11a normally closes the opening.

As is clear from the above, a substantial portion of the cable 73 is positioned within the sweep arm 16, and thus the sweep arm serves as an enclosure for the cable, as well as a structural member supporting the auger conveyor. The cable 73 is preferably highly flexible, and a 6 x 19 stainless steel cable has been found satisfactory for the purposes of the present invention. The diameter of the cable governs the size of the pulleys, which in turn determines the size of the track. It has been found that a ⅛" diameter cable provides a factor of about 5 over the required strength to move the sweep arm, and that a pulley diameter of about 20 times the cable diameter provides a system which maximizes cable life. The above described planetary drive system is remarkably friction free, and the torque required to rotate the sweep arm 16 at the desired speed is surprisingly low.

Referring now to the embodiment of FIGS. 7 and 8, it will be noted that the structure disclosed therein is similar to that illustrated in FIGS. 1–6; and accordingly, similar reference numerals have been used to indicate corresponding parts, and have been increased by the sum of 100. The principal difference between the embodiment of FIGS. 7 and 8 and that of FIGS. 1–6 is the orientation of idler pulleys 177 and 178. As is clear from a comparison of FIGS. 7 and 8, the axes of pulleys 175 and 176 are disposed in a vertical plane, while the axes of pulleys 177 and 178 are disposed in a horizontal plane. Additionally, pulleys 177 and 178 are disposed between pulleys 175 and 176, and are inclined slightly with respect to a center line extending therebetween. It will be readily apparent that the cable reach portions 173a and 173b extending outwardly from the driven sheave are trained respectively over pulleys 177 and 178 and guided thereby downwardly and inwardly toward pulleys 175 and 176, which in turn guide the cable portions laterally outwardly into the track 171.

Figure 10:
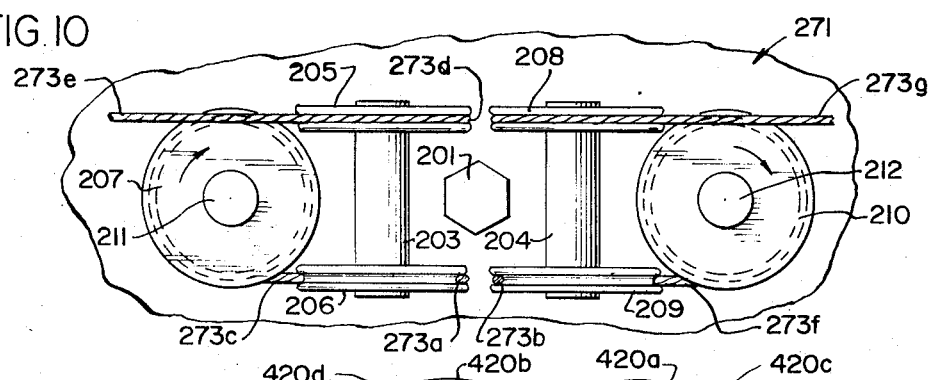
FIG. 10 is an enlarged detail view illustrating a portion of the drive system of the embodiment of FIG. 9.

Referring now to the embodiment of FIGS. 9–11, a planetary drive system is illustrated wherein the stationary track member is secured to the silo wall, rather than to the silo floor as in the embodiments of FIGS. 1–6 and FIGS. 7 and 8. As is best seen in FIG. 11, track 271 is generally U-shaped in cross section, and opens inwardly from the silo wall. Track 271 includes a bight portion 271a that is fixed to the silo wall 213 by suitable fasteners 201, and spaced parallel leg portions 271b and 271c disposed in planes parallel to the plane of movement of sweep arm 216. Track leg portions 271b and 271c are provided with downwardly and outwardly curved lips 271d and 271e, respectively, at the outer ends thereof. As will hereinafter appear, track lip 271d forms a stationary reaction member of a planetary drive system for rotating sweep arm 216.

Sweep arm 216 extends outwardly into track 271, and a pair of laterally spaced vertical shafts 203 and 204 are rotatably mounted on sweep arm 216 in track 271. Shafts 203 and 204 have respective pulleys 205 and 208 secured to the upper end thereof, and pulleys 205 and 208 are disposed in a common horizontal plane spaced above the plane of movement of sweep arm 216. Shafts 203 and 204 also have respective pulleys 206 and 209 secured to the lower ends thereof, and pulleys 206 and 209 are disposed in a common horizontal plane spaced below the plane of movement of sweep arm 216. Additional vertically disposed pulleys 207 and 210 are provided laterally outwardly of shafts 203 and 204 respectively, and pulleys 207 and 210 are secured to shafts 211 and 212 rotatably mounted on sweep arm 216. Pulleys 205 and 208 are disposed in horizontal alignment with track lip portion 271d, and pulleys 206 and 209 are preferably positioned generally in the plane of the drive sheave at the inner end of the sweep arm.

Cable reach portion 273a is trained over pulley 206, and is guided laterally outwardly thereby. Another cable portion 273c extends outwardly from pulley 206 and is trained upwardly over pulley 207. A further cable portion 273d extends from pulley 207 to pulley 205, and is guided forwardly and laterally outwardly thereby. A still further cable portion 273e is guided by pulley 205 into the stationary member defined by track portion 271d. In a like manner, cable reach portion 273b is trained around pulley 209, and is guided laterally outwardly thereby. A further cable portion 273f extends from pulley 209 to pulley 210 where it is guided upwardly. A further cable portion (not shown) extends from pulley 210 to pulley 208, and a still further cable portion 273g is directed by pulley 208 into the track portion 271b. From the foregoing it will be apparent that in the embodiment of FIGS. 9–11, the cable 273 feeds on and off the pulleys 205–210 with substantially perfect alignment, thereby minimizing the amount of abrasion on the side of the cable. This is an important feature of the present invention in that the cable is a highly flexible member which would deteriorate rapidly in an environment wherein the cable was continuously abraded.

The embodiment of FIG. 12 is similar to the embodiment of FIGS. 9–11, in that an inwardly opening, generally U-shaped track 371 is secured to the silo wall to define the stationary member of the planetary drive system. Track 371 includes a bight portion 371a, parallel legs 371b and 371c, and downwardly turned lip portions 371d and 371e on legs 371b and 371c, respectively. Spaced identical pairs of pulleys are provided at the outer end of the sweep arm 316 in the track 371, and one of said pairs is illustrated in FIG. 12 as including individual pulleys 305 and 306. Pulleys 305 and 306 are mounted on respective shafts 305a and 306a which are each inclined at approximately the same angle, but in opposite directions, from a plane perpendicular to the plane of movement sweep arm 316. It has been found that an angle of inclination of shafts 305a and 306a of approximately 6½° is suitable for appropriately guiding the cable without overly abrading the same. Thus, the cable reach portion 373a extending from the driven sheave is guided upwardly and rearwardly by pulley 306 where it is fed to pulley 305, from whence it is guided inwardly and upwardly into the stationary planetary member defined by the lip portion 471d of the track 371. The embodiment of FIG. 12 represents a substantial material saving over the embodiment of FIGS. 9–11, in that it requires two less pulleys, and a smaller track.

Figure 14:
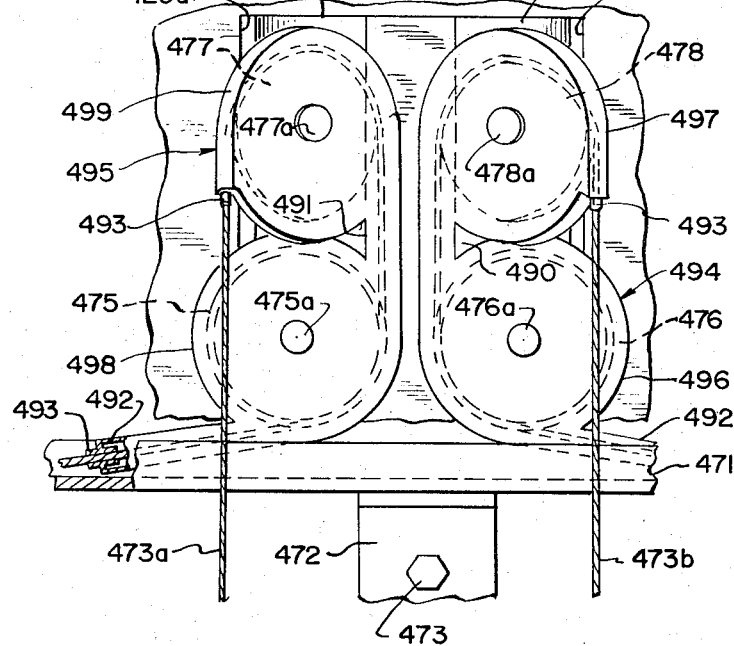
FIG. 14 is a plan view of the structure illustrated in FIG. 13.
Figure 13:
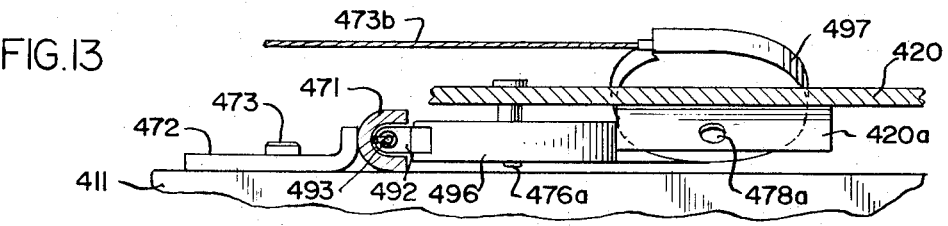
FIG. 13 is a view similar to FIG. 5, and illustrating a still further embodiment of the invention.

Turning now to the embodiment of FIGS. 13 and 14, a pulley arrangement is illustrated therein which is similar to that shown in the embodiment of FIGS. 1–6, so that similar reference numerals have been used to indicate corresponding elements, and have been increased by the sum of 400. When unloading certain substances from the silo, such as moist haylage, it is desirable to provide means for preventing this material from being entrapped in the grooves of the pulleys. In the embodiment of FIGS. 13 and 14 a pair of plastic sheaths are provided for this purpose, and a first sheath 494 encloses pulleys 476 and 478 therein, while a second sheath 495 encloses pulleys 475 and 477 therein. Sheath 494 includes a horizontal portion 496 having pulley 476 therein, and secured to sweep arm portion 420 by fastener 476a; an inclined portion 497 having pulley 478 therein, and secured to sweep arm portion 420a by fastener 478a; and an inclined portion 490 connecting portions 496 and 497. In a like manner, sheath 495 includes a horizontal portion 498 secured below sweep arm portion 420 by fastener 475a, and having pulley 475 therein; and inclined portion 499 secured to portion 420b of sweep arm portion 420 and having pulley 477 therein; and an inclined portion 491 connecting portions 498 and 499. Tubular portions 492 extend tangentially inwardly from sheath portions 496 and 498 for guiding the cable into the track 471. Scavenging sleeves 493 may be provided at the entrance portions of the protective sheaths for removing material which may be adhered to the cables.

From the foregoing it will be readily apparent that the present invention provides several novel embodiments of the planetary drive system for the sweep arm of a bottom unloading silo. Each embodiment of the planetary drive system includes a flexible drive transmitting member therein, which minimizes friction and wear between the drive members of the systems, and which reduces torque requirements. Since no positive interengaging members are provided in the planetary drive systems, the extreme alignment accuracy heretofore required with positive engagement systems is eliminated. Each of the systems is relatively simple in design, so that manufacturing and maintenance costs are relatively slight. The planetary drive system for rotating the auger carrying sweep arm is independent of the drive to the auger, so that the direction of rotation of the sweep arm may be reversed when desired. In certain embodiments of the invention, the drive system for rotating the sweep arm is entirely independent of the silo wall, further simplifying the system. Thus, it will be obvious that each of the objects of the invention have been fully achieved.

We claim:

1. In a silo unloader having a floor with an axial opening and having an upright cylindrical wall, unloader means comprising: a sweep arm extending generally radially of the silo adjacent the floor; means mounting said arm for rotation about the axis of said silo; conveyor means on said arm for moving silage toward the axial opening; and planetary drive means for rotating said arm including a driven sun member, a generally circular stationary member, a planet member rotatably mounted on said arm and driven by said sun member, and an endless flexible drive transmitting member wrapped around said stationary member and said planet member, whereby said arm is rotated upon rotation of said sun member.

2. In a silo unloader having a floor with an axial opening and having an upright cylindrical wall, unloader means comprising: a sweep arm extending generally radially of the silo adjacent the floor; means mounting said arm for rotation about the axis of said silo; conveyor means on said arm for moving silage toward the axial opening; and drive means for rotating said arm including, a generally circular stationary member, a driven member rotatably mounted on said arm, reaction structure on said arm, and an endless flexible drive transmitting member wrapped around said stationary member, said reaction structure and said driven member, whereby said arm is rotated upon rotation of said driven member.

3. The silo unloader of claim 2 wherein said flexible drive transmitting member is restrained against movement relative to said stationary member by friction therebetween.

4. The silo unloader of claim 3 wherein said stationary member is a generally circular track positioned concentrically outwardly of said silo axis.

5. The silo unloader of claim 4 wherein said reaction structure includes guide means for guiding said flexible member into said track.

6. The silo unloader of claim 5 wherein said guide means includes a first pair of pulleys mounted on said arm adjacent said track, each pulley having one reach of said flexible drive transmitting member trained thereover for feeding the member into said track.

7. The silo unloader of claim 6 wherein said pulleys are positioned radially outwardly of said track, and are disposed in a common horizontal plane with said track.

8. In a silo unloader having a floor with an axial opening and having an upright cylindrical wall, unloader means comprising: a sweep arm extending generally radially of the silo adjacent the floor; means mounting said arm for rotation about the axis of said silo; conveyor means on said arm for moving silage toward the axial opening; and drive means for rotating said arm including, a stationary member comprising a generally circular track positioned concentrically outwardly of said silo axis, a driven member rotatably mounted on said arm, reaction structure on said arm and including guide means comprising a first pair of pulleys mounted on said arm radially outwardly of said track and disposed in a common horizontal plane with said track and a second pair of pulleys mounted on said arm outwardly of said first pair, and an endless flexible drive transmitting member wrapped around said track and said driven member, each pulley of said second pair having one reach of said flexible drive transmitting member trained thereover for guiding the respective reach to one pulley of said first pair of pulleys, each pulley of said first pair having one reach of said flexible drive transmitting member trained thereover for guiding the member into said track, said flexible drive transmitting member being restrained against movement relative to the track by friction therebetween, whereby said arm is rotated upon rotation of said driven member.

9. The silo unloader of claim 8 wherein the track is mounted on the silo floor, and the sweep arm rotates in a horizontal plane above the track.

10. The silo unloader of claim 9 wherein said driven member is positioned above the plane of movement of said sweep arm, and each pulley of said second pair of pulleys has a portion above said sweep arm and a portion below said sweep arm.

11. The silo unloader of claim 10 wherein each pulley of said second pair of pulleys is positioned at an angle with respect to the sweep arm.

12. The silo unloader of claim 11 wherein said angle is 90°.

13. In a silo unloader having a floor with an axial opening and having an upright cylindrical wall, unloader means comprising: a sweep arm extending generally radially of the silo adjacent the floor; means mounting said arm for rotation about the axis of said silo; conveyor means on said arm for moving silage toward the axial opening; and drive means for rotating said arm including, a stationary member comprising a generally circular track positioned concentrically outwardly of said silo axis and spaced from said arm, a driven member rotatably mounted on said arm, reaction structure on said arm and including guide means comprising a first pair of pulleys mounted on said arm adjacent said track, each pulley of said first pair of pulleys being inclined from said arm toward said track, and an endless flexible drive transmitting member wrapped around said track and said driven member, each pulley of said first pair having one reach of said flexible drive transmitting member trained thereover for guiding the member into the track, whereby said arm is rotated upon rotation of said driven member.

14. The silo unloader of claim 13 wherein said guide means includes a second pair of pulleys mounted on said arm, each pulley of said second pair being inclined from said arm toward one pulley of said first pair of pulleys for guiding one reach of said flexible member into said one pulley.

15. In a silo unloader having a floor with an axial opening and having an upright cylindrical wall, unloader means comprising: a sweep arm extending generally radially of the silo adjacent the floor; means mounting said arm for rotation about the axis of said silo; conveyor means on said arm for moving silage toward the axial opening; and drive means for rotating said arm including, a stationary member comprising a generally circular track mounted on and extending inwardly of said silo wall concentrically outwardly of the silo axis, a driven member rotatably mounted on said arm, reaction structure on said arm and including guide means comprising a first pair of pulleys mounted on said arm adjacent said track, and an endless flexible drive transmitting member wrapped around said track and said driven member, each pulley of said first pair having one reach of said flexible drive transmitting member trained thereover for guiding the member into the track, whereby said arm is rotated upon rotation of said driven member.

16. The silo unloader of claim 15 wherein said sweep arm moves in a horizontal plane below said track, and each pulley of said first pair of pulleys is mounted radially outwardly of said track.

17. The silo unloader of claim 16 wherein said pulleys are disposed in a common horizontal plane with said track.

18. The silo unloader of claim 17 wherein said guide means includes a second pair of pulleys mounted on said sweep arm and disposed in a horizontal plane below said sweep arm, each pulley of said second pair having a reach of said flexible member trained thereover, said guide means further including a third pair of pulleys mounted on said arm and disposed in a vertical plane, each pulley of said third pair having a reach of said flexible member trained thereover for guiding the respective reach from a pulley of said second pair of pulleys to a pulley on said first pair of pulleys.

19. The silo unloader of claim 18 wherein each pulley of said second pair of pulleys is positioned in vertical alignment with one pulley of said first pair of pulleys, and each pulley of said third pair of pulleys is positioned generally radially outwardly of said first and second pair of pulleys.

20. The silo unloader of claim 16 wherein each pulley of said first pair of pulleys is inclined upwardly toward said track for guiding a reach of said flexible member upwardly and inwardly into said track.

21. The silo unloader of claim 20 wherein said guide means further includes a second pair of pulleys mounted on said arm, each pulley of said second pair of pulleys being inclined upwardly from said arm and having an upper portion generally horizontally aligned with the lower portion of one pulley of said first pair of pulleys for guiding one reach portion of said flexible member upwardly toward said one pulley of said first pair of pulleys.

22. In a silo unloader having a floor with an axial opening and having an upright cylindrical wall, unloader means comprising: a sweep arm extending generally radially of the silo adjacent the floor; means mounting said arm for rotation about the axis of said silo; conveyor means on said arm for moving silage toward the axial opening; and drive means for rotating said arm including, a stationary member comprising a generally circular track positioned concentrically outwardly of the silo axis, a driven member rotatably mounted on said arm, reaction structure on said arm and including guide means comprising a first pair of pulleys mounted on said arm adjacent said track, an endless flexible drive transmitting member wrapped around said track and said driven member, each pulley of said first pair having one reach of said flexible drive transmitting member trained thereover for guiding the member into the track, and a protective sheath encasing each of said pulleys, said sheaths having inlet and outlet openings for admitting a reach of said flexible drive transmitting member into the interior thereof and for feeding the reach outwardly therefrom whereby said arm is rotated upon rotation of said driven member.

23. The silo unloader of claim 22 wherein scavenging means are provided adjacent the inlet opening of each sheath for removing material from said flexible member.

24. The silo unloader of claim 2 wherein said driven member is a sheave fixed on a shaft rotatably mounted on said arm.

25. The silo unloader of claim 24 wherein said sheave includes first and second pulley sections, one reach of the flexible member being trained over the first pulley section and the other reach of the flexible member being trained over the other pulley section.

26. The silo unloader of claim 24 wherein a closed loop of said flexible member extends forwardly of said sheave, and take up means are connected to said loop for tensioning said flexible member.

27. The silo unloader of claim 26 wherein means are provided for adjusting said take up means for varying the tension in said flexible member.

28. The silo unloader of claim 2 wherein a first power source is drivingly connected to said conveyor means, and a second power source is drivingly connected to said driven member.

29. The silo unloader of claim 28 wherein said second power source is reversible whereby the direction of rotation of said sweep arm may be reversed.

30. The silo unloader of claim 28 wherein said first and second power sources are fixedly mounted in said opening.

31. The silo unloader of claim 30 wherein said first power source includes an output shaft extending axially of said silo, said output shaft having a sun member mounted thereon for rotation independently thereof; and means drivingly connecting the second power source to the sun member, and the driven member to the sun member whereby a planetary combination is effected.

References Cited

UNITED STATES PATENTS 2,177,941    10/1939    Knudson et al. _____ 212—27
3,237,788    3/1966    Weaver et al. _____ 214—17

ROBERT G. SHERIDAN, *Primary Examiner.*